UNITED STATES PATENT OFFICE.

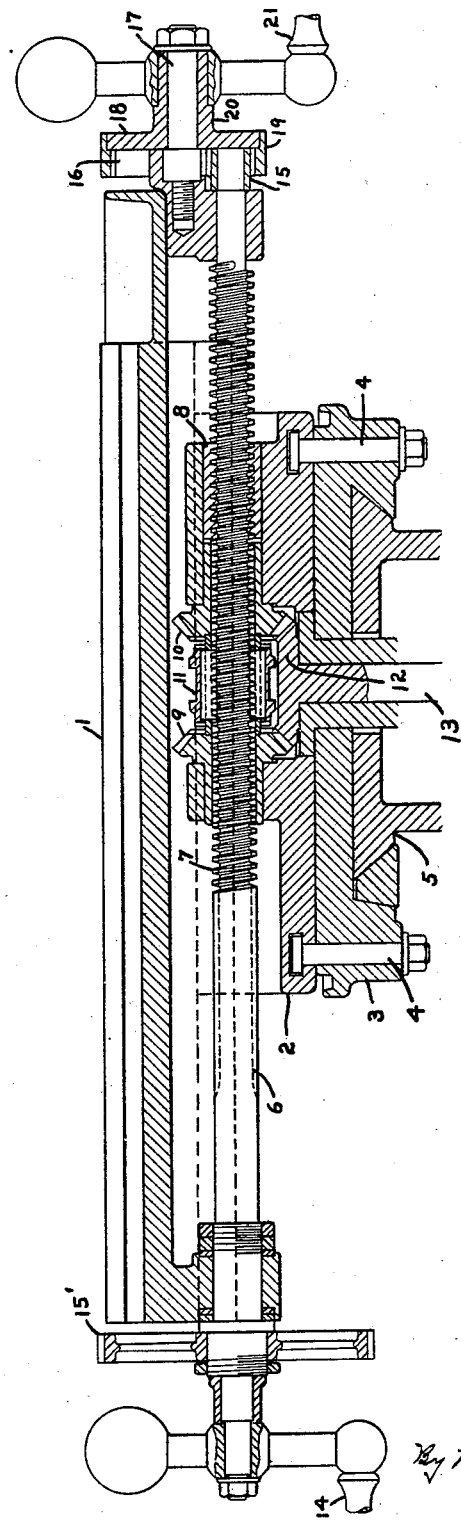

OSCAR J. BEALE, OF PROVIDENCE, RHODE ISLAND, ASSIGNOR TO THE BROWN & SHARPE MANUFACTURING COMPANY, OF SAME PLACE.

MILLING-MACHINE.

SPECIFICATION forming part of Letters Patent No. 631,923, dated August 29, 1899.

Application filed November 26, 1897. Serial No. 659,810. (No model.)

*To all whom it may concern:*

Be it known that I, OSCAR J. BEALE, of the city and county of Providence, State of Rhode Island, have invented certain new and useful Improvements in Milling-Machines; and I do hereby declare the following specification, taken in connection with the accompanying drawing, forming a part of the same, to be a full, clear, and exact description thereof.
The present invention relates to that class of milling-machines in which the work-carrying table or platen is fed by means of a screw and nut, one of said members being carried by the table and the other being carried by the saddle or support on which the carriage is mounted, which class of machines are termed "screw-feed" machines. In this class of machines it has been customary to provide means for automatically operating the screw to feed the table and to also provide one end of the screw rod or shaft with a hand wheel or crank for manually feeding or adjusting the table. After the table has been fed forward to carry the work past the cutter the automatic feed is usually thrown out and the table returned by manually operating the screw, and since the movement of the table is slow when effected by the crank or wheel above referred to various devices and mechanisms have been employed for effecting a quick return of the table or effecting a large adjustment thereof.

The present invention relates to a mechanism for effecting a quick or rapid travel of the table of a screw-feed machine; and it consists in a pinion connected with the screw rod or shaft and an internal gear engaging said pinion, which gear may be manually operated by means of a crank or handle secured thereto. By thus operating the screw-shaft by means of an internal gear and a pinion connected with the shaft the gear will turn in the same direction that the shaft turns, and by turning the gear from right to left, which is the natural and convenient way to turn said gear, the carriage will be fed away from the operator, provided a right-hand thread is used upon the screw-rod. In other words, the direction in which the gear must be turned to effect a certain movement of the table will be the same that it would be were a crank secured directly to the screw-rod, and the relative movements of table and the handles or cranks at the ends of the table are therefore the same—that is, the rotation of either causes the table to move in the direction that it would move were such handle secured directly upon the screw-rod. Moreover, by using an internal gear engaging a pinion a larger gear may be used than would be practical were an external gear used, since the pinion lies within the periphery of the gear, and the table may be fed at a correspondingly higher rate of speed and the efficiency of the machine increased. With this construction the gear may be in the form of a dished disk and will thus serve as a guard or shield for protecting and covering the gearing.

In the accompanying drawing the present invention is shown applied to the milling-machine illustrated and described in Patent No. 497,850, granted to S. L. Worsley May 23, 1893.

The figure shows a sectional view taken longitudinally of the table.

Referring to said drawing, the table 1 is mounted upon ways formed on the plate 2, which is mounted to turn upon the saddle 3 to adjust the angle of the table, said plate being secured in its adjusted position by bolts 4, as shown in said patent. The saddle is mounted upon ways formed on the knee 5 in the usual manner. A feed rod or shaft 6 is mounted in suitable bearings on the table 1 and is provided with a screw-thread 7, which engages a nut 8, secured to the plate 2. Two beveled gears 9 and 10 are mounted in the plate 2 and are provided with clutch-faces constructed to be engaged by a clutch 11, keyed upon the shaft 6 in the manner set forth in said patent. These gears are driven by a gear 12 on the end of a shaft 13, as also clearly set forth in said patent, the table being fed in one direction or the other, according as the gear 9 or the gear 10 is engaged by the clutch 11. A crank-handle 14 is secured to one end of the shaft 6, and by turning this handle the table may be manually fed or adjusted. A gear 15' may be secured to the shaft 6 for operating a universal head or other mechanism secured upon the table 1.

With the mechanism thus far described the table may be automatically fed to carry the work past the cutter, and the table may then be manually returned by turning the handle 14; but this return movement is comparatively slow, as the screw makes but a single turn for each revolution of the handle 14, and a mechanism for effecting a quick return of the carriage is therefore applied to the machine, which mechanism embodies the present invention and is as follows: A pinion 15 is secured upon the end of the feed-shaft and is engaged by an internal gear 16, mounted upon a stud 17, secured to the table 1. The gear 16 is preferably in the form of a disk 18, provided with a flange 19, upon the inner surface of which the gear-teeth which mesh with the pinion 15 are formed. The gear 16 is provided with a hub 20, to which a crank-handle 21 is secured for operating the gear. With this construction the pinion lies within the gear 16, and the space occupied by the mechanism is thereby reduced, and a larger gear may be used than would be convenient or practicable were an external gear used, and, moreover, the gear and the feed-shaft will turn in the same direction, with the result that the table may be more conveniently operated and with less liability to confusion on the part of the operator than would be the case with an external gear, which would turn the shaft in a reverse direction. By forming the gear 16 in the form of a flanged or dished disk the end of the feed-shaft and the pinion are covered and inclosed, and the necessity for an independent guard or shield is obviated.

What I claim as my invention, and desire to secure by Letters Patent, is—

1. In a milling-machine, the combination with a table, and a support therefor, of a screw-shaft mounted upon one of said parts, a nut secured upon the other part, and means for turning said screw to give said table a slow feed, and means for giving said table a quick return or rapid travel consisting of a pinion connected to said screw-shaft, and a normally-operated internal gear engaging said pinion, substantially as described.

2. In a milling-machine, the combination with a table, and a support therefor, of a screw-shaft mounted on said table, a nut secured to said support, means for turning said screw-shaft to give the table a slow feed, and means for giving said table a quick return or rapid travel consisting of a pinion secured to the end of said screw-shaft, and a normally-operated internal gear mounted on the table and engaging said pinion, substantially as described.

3. In a milling-machine, the combination with a table, a support therefor, a screw-shaft on said table, a nut secured to said support, a crank-handle secured to one end of said shaft, a pinion secured to the other end of said shaft, and a manually-operated internal gear engaging said pinion, substantially as described.

4. In a milling-machine, the combination with a table, of a support therefor, a screw-shaft mounted on said table, a nut secured to said support, means for automatically operating said screw-shaft to feed the table, means for manually operating said shaft to give said table a slow travel, and means for giving said table a quick return or rapid travel consisting of a pinion secured to the end of said screw-shaft, and a manually-operated internal gear mounted on the table and engaging said pinion, substantially as described.

5. In a milling-machine, the combination with a table, of a support therefor, a screw-shaft on said table, a nut secured to said support, means for turning said screw-shaft to give the table a slow feed or travel, and means for giving said table a quick return or rapid travel consisting of a pinion secured to the end of said screw-shaft, and a manually-operated disk mounted on said table and provided with a flange having gear-teeth on its inner surface engaging said pinion, substantially as described.

OSCAR J. BEALE.

Witnesses:
R. A. BATES,
W. H. THURSTON.